US012014860B2

(12) United States Patent
Park et al.

(10) Patent No.: US 12,014,860 B2
(45) Date of Patent: Jun. 18, 2024

(54) COIL COMPONENT

(71) Applicant: SAMSUNG ELECTRO-MECHANICS CO., LTD., Suwon-si (KR)

(72) Inventors: Myoung Soon Park, Suwon-si (KR); Sung Hee Kim, Suwon-si (KR); Han Kyeol Kim, Suwon-si (KR); Ji Young Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 597 days.

(21) Appl. No.: 17/230,461

(22) Filed: Apr. 14, 2021

(65) Prior Publication Data

US 2022/0208434 A1 Jun. 30, 2022

(30) Foreign Application Priority Data

Dec. 28, 2020 (KR) ........................ 10-2020-0184111

(51) Int. Cl.
*H01F 27/28* (2006.01)
*H01F 27/29* (2006.01)
*H01F 27/32* (2006.01)
*H01F 27/33* (2006.01)
*H01F 41/04* (2006.01)

(52) U.S. Cl.
CPC ......... *H01F 27/2804* (2013.01); *H01F 27/29* (2013.01); *H01F 27/323* (2013.01); *H01F 27/33* (2013.01); *H01F 41/041* (2013.01)

(58) Field of Classification Search
CPC .... H01F 27/2804; H01F 27/29; H01F 27/323; H01F 27/33; H01F 27/2871; H01F 41/041; H01F 27/2885; H01F 27/324; H01F 27/292; H01F 2017/048; H01F 17/0013; H01F 27/28; H01F 27/34
USPC .................................................. 336/200, 232
See application file for complete search history.

(56) References Cited

U.S. PATENT DOCUMENTS

2001/0040495 A1* 11/2001 Morikawa ........... H01F 17/0013 336/223
2014/0292469 A1* 10/2014 Cha ..................... H01F 17/0013 336/200
2017/0092413 A1* 3/2017 Matsunaga ......... H01F 27/2804
2018/0268988 A1* 9/2018 Lee ....................... H01F 41/041
2019/0311831 A1* 10/2019 Yeo ....................... H01F 41/042
2021/0020359 A1 1/2021 Lee et al.

FOREIGN PATENT DOCUMENTS

KR 10-1863280 B1 5/2018
KR 10-2021-0009528 A 1/2021

* cited by examiner

*Primary Examiner* — Shawki S Ismail
*Assistant Examiner* — Kazi S Hossain
(74) *Attorney, Agent, or Firm* — Morgan, Lewis & Bockius LLP

(57) ABSTRACT

A coil component includes: a body; an insulating layer disposed in the body; a coil portion including a first coil pattern embedded in the insulating layer and having a first surface exposed to a first surface of the insulating layer and a second coil pattern disposed on a second surface of the insulating layer, facing the first surface of the insulating layer; and a noise removing portion disposed in the insulating layer and spaced apart from the first and second coil patterns, respectively.

15 Claims, 4 Drawing Sheets

I-I'

COIL COMPONENT

CROSS-REFERENCE TO RELATED APPLICATION(S)

This application claims the benefit of priority to Korean Patent Application No. 10-2020-0184111 filed on Dec. 28, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device together with a resistor and a capacitor.

As electronic devices have become increasingly more high-performance, smaller, and thinner, coil components used in electronic devices are also continuously being miniaturized and thinned.

For the reason described above, there is an increasing demand for technologies for removing noise such as electromagnetic interference (EMI) of the coil component.

In addition, a support member used to apply a thin film technology should have a predetermined thickness to maintain rigidity thereof. Therefore, a thickness of a magnetic material covering a coil is invariably reduced, and thus, there is a limitation in implementing high magnetic permeability (Ls).

Accordingly, there is a need for a technology for implementing a coil component having a coreless structure not using a support member.

SUMMARY

An aspect of the present disclosure may provide a coil component capable of easily removing noise.

According to an aspect of the present disclosure, a coil component may include: a body; an insulating layer disposed in the body; a coil portion including a first coil pattern embedded in the insulating layer and having a first surface exposed to a first surface of the insulating layer and a second coil pattern disposed on a second surface of the insulating layer, facing the first surface of the insulating layer; and a noise removing portion disposed in the insulating layer and spaced apart from the first and second coil patterns, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
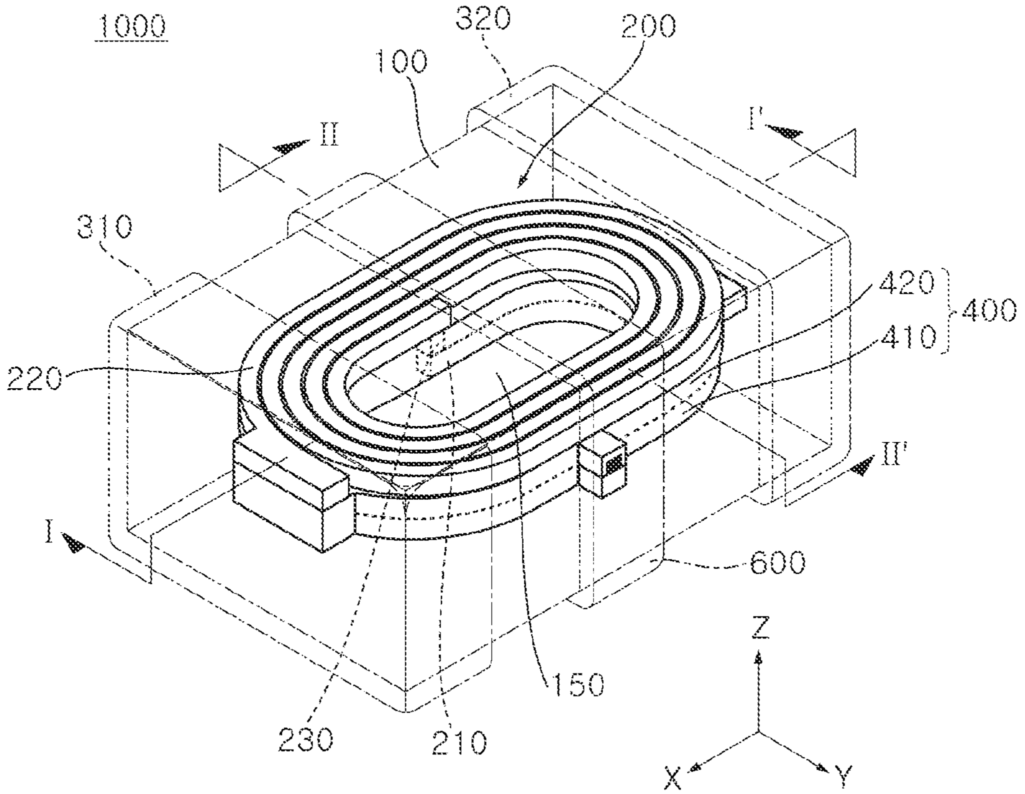
FIG. 1 is a schematic perspective view illustrating a coil component according to an exemplary embodiment in the present disclosure.

Hereinafter, exemplary embodiments of the present disclosure will now be described in detail with reference to the accompanying drawings.

Defining directions in order to clearly describe embodiments in the present disclosure, X, Y and Z in the drawings refer to a length direction, a width direction, and a thickness direction of a coil component, respectively In addition, in the present specification, a length direction may be used as the same concept as an X direction or a first direction, a width direction may be used as the same concept as a Y direction or a second direction, and a thickness direction may be used as the same concept as a Z direction, a third direction, or a stacking direction, respectively.

Coil Component

Various kinds of electronic components may be used in electronic devices, and various kinds of coil components may be appropriately used between these electronic components depending on their purposes such as removal of noise.

That is, the coil components used in the electronic devices may be a power inductor, high frequency (HF) inductors, a general bead, a bead for a high frequency (GHz), a common mode filter, and the like.

A thin film coil component that is usefully used for the power inductor, etc., generally uses a laminate with copper foil coated on both sides of a resin layer, known as a copper clad laminate (CCL), and implements a coil in a symmetrical structure between the top and bottom around the CCL. However, in the case of using the CCL, when a circuit and plating process for the coil is completed, a chip is made by compressing with a magnetic material. The amount of magnetic material that may be filled is limited due to the thickness of the CCL, and thus, it is difficult to improve efficiency beyond a certain amount.

On the other hand, when the thickness of the CCL is lowered, the rigidity of the material may decrease, and thus, it may be difficult to use a horizontal line of a substrate process normally. For example, the material may be bent and rolled to be damaged, and the risk of product damage may increase even when moving between processes.

Unlike the conventional thin film coil component, the coil component according to an exemplary embodiment in the present disclosure described below does not use the CCL (support member). Instead, in the coil component according to the present exemplary embodiment, a first coil pattern layer is embedded using an insulating layer, and a second coil pattern layer is disposed on the insulating layer.

A coil portion having this arrangement may minimize its own thickness, and thus a volume occupied by a magnetic material of a body surrounding the coil portion may be secured to the maximum. As a result, it is easy to realize a high-capacity coil component.

In particular, a shield layer (noise removing portion) provided inside the insulating layer may not only effectively remove EMI noise occurring in the coil component, but may also maintain the rigidity of the coil component in place of the conventional CCL (support member).

Hereinafter, a structure of a coil component according to an exemplary embodiment in the present disclosure will be described in more detail with reference to the drawings.

Figure 2:
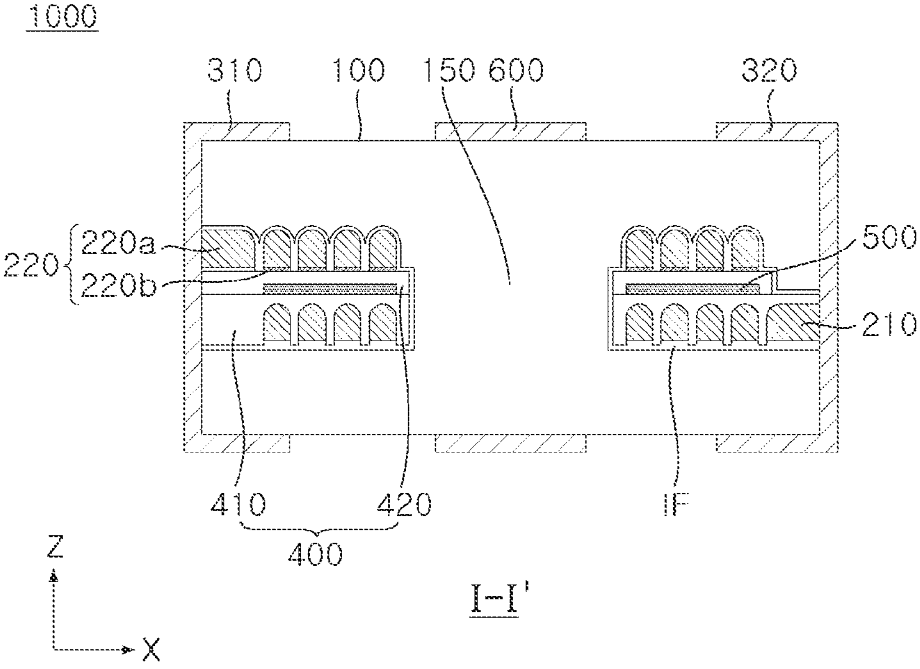
FIG. 2 is a cross-sectional view taken along line I-I' of FIG. 1.
Figure 3:
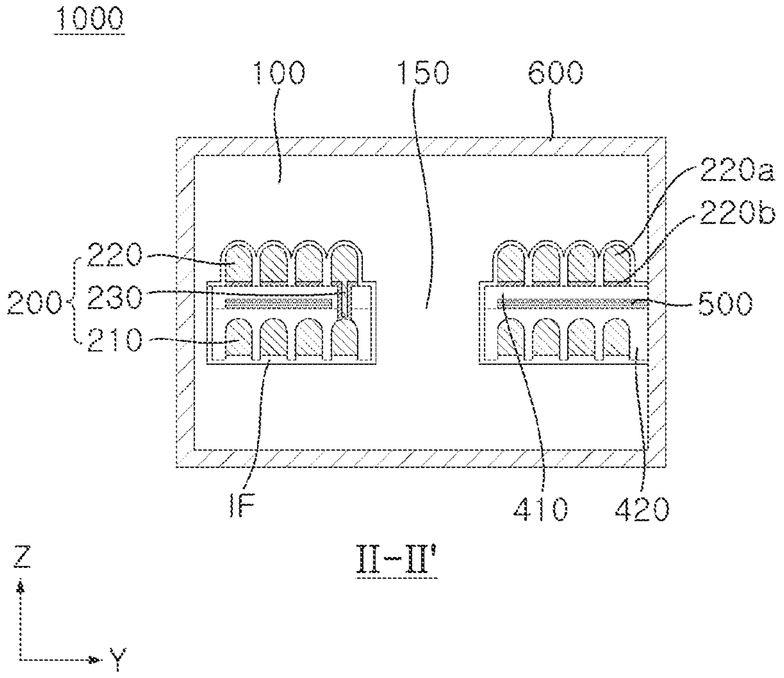
FIG. 3 is a cross-sectional view taken along line II-II' of FIG. 1.
Figure 4:
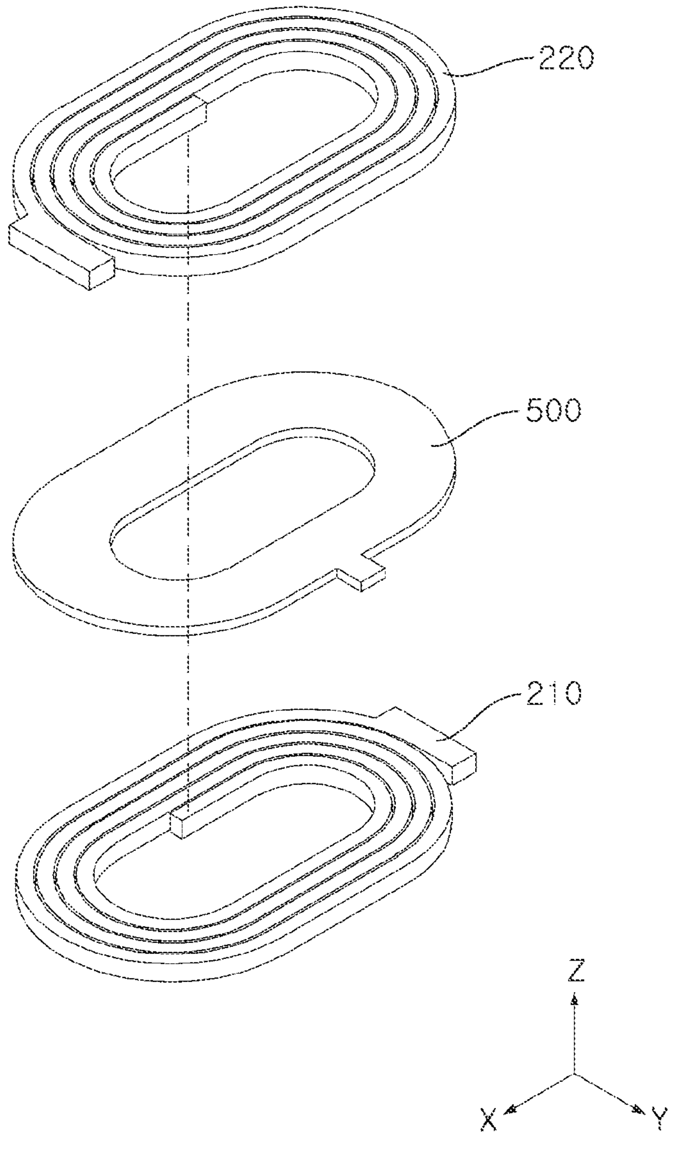
FIG. 4 is an exploded perspective view schematically illustrating an arrangement relationship of a coil portion and a noise removing portion applied to an exemplary embodiment in the present disclosure.

FIG. 1 is a schematic perspective view illustrating a coil component according to an exemplary embodiment in the present disclosure, FIG. 2 is a cross-sectional view taken along line I-I' of FIG. 1, FIG. 3 is a cross-sectional view taken along line II-II' of FIG. 1, and FIG. 4 is an exploded perspective view schematically illustrating an arrangement relationship of a coil portion and a noise removing portion applied to an exemplary embodiment in the present disclosure. Meanwhile, in order to more clearly show the arrangement relationship between the coil portion and the noise removing portion, the insulating layer applied to the exemplary embodiment in the present disclosure is not illustrated in FIG. 4.

Referring to FIGS. 1 to 4, a coil component 1000 according to an exemplary embodiment in the present disclosure may include a body 100, a coil portion 200, an insulating layer 400, and a noise removing portion 500. In addition, the coil component 1000 may further include external electrodes 310 and 320 and a ground electrode 600.

The insulating layer 400 may be disposed on the body 100. The coil portion 200 may include a first coil pattern 210 that is embedded in the insulating layer 400 and has a first surface exposed to a first surface of the insulating layer 400, and a second coil pattern 220 that is disposed on a second surface of the insulating layer 400 facing the first surface of the insulating layer 400. The noise removing portion 500 may be disposed in the insulating layer 400 to be spaced apart from the first and second coil patterns 210 and 220, respectively.

The body 100 may form an appearance of the coil component 1000 according to the exemplary embodiment in the present disclosure, and may have the coil portion 200 and the insulating layer 400 embedded therein.

The body 100 may generally have a hexahedral shape. That is, the body 100 may include both surfaces facing each other in an X direction, both surfaces facing each other in a Y direction, and both surfaces facing each other in a Z direction.

The body 100 may include magnetic materials and a resin. Specifically, the body 100 may be formed by stacking one or more magnetic composite sheets including a resin and magnetic materials dispersed in the resin. However, the body 100 may also have a structure other than a structure in which the magnetic materials are dispersed in the resin. For example, the body 100 may be formed of a magnetic material such as ferrite.

Here, the magnetic material may be ferrite or metal magnetic powder particles.

The ferrite powder particles may be, for example, at least one of spinel type ferrites such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrites such as Y-based ferrite, and Li-based ferrite.

Examples of the metal magnetic powder particles may include at least any one selected from the group consisting of iron (Fe), silicon (Si), chromium (Cr), cobalt (Co), molybdenum (Mo), aluminum (Al), niobium (Nb), copper (Cu), and nickel (Ni). Examples of the magnetic metal powder particles may include at least one of pure iron powder particles, Fe—Si-based alloy powder particles, Fe—Si—Al-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The metal magnetic powder particles may be amorphous or crystalline. Examples of the metal magnetic powder particles may include Fe—Si—B—Cr-based amorphous alloy powder particles, but the magnetic powder particles are not necessarily limited thereto.

The ferrite and metal magnetic powder particles may each have an average diameter of about 0.1 μm to 30 μm, but are not limited thereto.

The body 100 may include two kinds or more of magnetic materials dispersed in the resin. Here, different kinds of magnetic materials mean that the magnetic materials dispersed in the resin are distinguished from each other by at least one of an average diameter, a composition, crystallinity, and a shape.

The resin may include epoxy, polyimide, liquid crystal polymer, or the like alone or in combination, but is not limited thereto.

The body 100 includes a core 150 penetrating through the coil portion 200 to be described later. The core 150 may be formed by filling a through-hole of the coil portion 200 with the magnetic composite sheet, but is not limited thereto.

The coil portion 200 may be embedded in the body 100, and may implement characteristics of the coil component. For example, when the coil component 1000 according to the present exemplary embodiment is used as a power inductor, the coil portion 200 may serve to store an electric field as a magnetic field and maintain an output voltage, thereby stabilizing power of an electronic device.

The coil portion 200 may include the first and second coil patterns 210 and 220 that are formed in parallel in a thickness direction (Z direction) of the body 100 and a via 230 penetrating through the insulating layer 400 to connect the first and second coil patterns 210 and 220 to each other.

Each of the first coil pattern 210 and the second coil pattern 220 may have a planar spiral shape in which at least one turn is formed around the core 150. As an example, as illustrated in FIG. 1, the first coil pattern 210 may form at least one turn downwardly in the Z direction around the core 150, and the second coil pattern 220 may form at least one turn upward in the Z direction around the core 150.

End portions of the first and second coil patterns 210 and 220 may be connected to a pair of external electrodes 310 and 320 to be described later, respectively. That is, as an example, the end portion of the first coil pattern 210 may extend to be exposed to a first end surface of the body 100 in the X direction, and the end portion of the second coil pattern 220 may extend to be exposed to a second end surface of the body 100 in the X direction, and thus, the first coil pattern 210 and the second coil pattern 220 may be in contact with the external electrodes 310 and 320 formed on both end surfaces of the body 100 in the X direction, respectively. In this case, each of the first and second coil patterns 210 and 220 including the end portion may be integrally formed.

Referring to FIGS. 2 and 3, the first coil pattern 210 may be disposed in the body 100 and may be embedded by the insulating layer 400.

A pattern of the first coil pattern 210 may be formed of the known conductive material such as copper (Cu), aluminum (Al), silver (Ag), tin (Sn), gold (Au), nickel (Ni), lead (Pb), titanium (Ti), or alloys thereof.

The first coil pattern 210 may include a plating layer, but may not include a seed layer. The seed layer of the first coil pattern 210 may be removed by etching during the process. That is, the first coil pattern 210 may only be formed of the plating layer. In this case, the plating layer may be a single layer or multiple layers.

A lower surface of the first coil pattern 210 may have a step difference from a lower surface of the insulating layer 400. That is, the lower surface of the first coil pattern 210 may be recessed upwardly with respect to the lower surface of the insulating layer 400. The lower surface of the first coil pattern 210 may be exposed to the lower surface of the insulating layer 400, that is, a lower surface of a first insulating layer 410 to be described later, and the exposed lower surface of the first coil pattern 210 may be covered with an insulating film IF. Here, a cross-sectional shape of the pattern forming the first coil pattern 210 is not limited to that illustrated in the drawings, and may vary in various forms according to the plating method.

The second coil pattern 220 may be disposed on the first surface of the insulating layer 400. That is, the second coil pattern 220 may be disposed on an upper surface of a second insulating layer 420 to be described later.

A pattern of the second coil pattern 220 may be formed of the known conductive material such as copper (Cu), aluminum (Al), silver (Ag), tin (Sn), gold (Au), nickel (Ni), lead (Pb), titanium (Ti), or alloys thereof.

The second coil pattern 220 may include a plating layer **220*a* and a seed layer 220*b*. The seed layer 220*b* may be disposed between the plating layer 220*a* and the second insulating layer 420**.

The plating layer **220*a* and the seed layer 220*b* may be a single layer or multiple layers, respectively. Each of the plating layer 220*a* and the seed layer 220*b* may include the above-described conductive material, and all may include copper (Cu) as a non-limiting example, but are not limited thereto. The plating layer 220*a* and the seed layer 220*b*** may have a clear boundary depending on the manufacturing process.

The upper and side surfaces of the second coil pattern 220 may be covered with the insulating film IF. In addition, a space between the patterns of the second coil pattern 220 may be filled with the insulating film IF. Here, a cross-sectional shape of the pattern forming the second coil pattern 220 is not limited to that illustrated in the drawings, and may vary in various forms according to the plating method.

Referring to FIG. 3, the via 230 is formed to penetrate through the insulating layer 400. The via 230 may electrically connect the first coil pattern 210 and the second coil pattern 220.

The via 230 may also be formed of the known conductive material such as copper (Cu), aluminum (Al), silver (Ag), tin (Sn), gold (Au), nickel (Ni), lead (Pb), titanium (Ti), or alloys thereof. The shape of the via 230 is not particularly limited, and all known shapes such as a cylindrical shape and a tapered shape may be applied.

The via 230 may be formed together when forming the second coil pattern 220, and as a result, may be integrated with the second coil pattern 220, but is not limited thereto. The via 230 may also be formed of multiple layers including the seed layer and the plating layer.

The insulating layer 400 buries the first coil pattern 210, and an arrangement space of the second coil pattern 220 is provided on the first surface of the insulating layer 400.

The insulating layer 400 may include the first insulating layer 410 and the second insulating layer 420. The insulating layer 400 including the first and second insulating layers 410 and 420 may include a thermosetting resin such as an epoxy resin or a thermoplastic resin such as polyimide, but is not limited thereto.

The first insulating layer 410 may cover the first coil pattern 210, and the noise removing portion 500 may be disposed on the first surface of the first insulating layer 410. In this case, the first coil pattern 210 may be spaced apart from the first surface of the first insulating layer 410 on which the noise removing portion 500 is disposed, and may be exposed to the second surface of the first insulating layer 410. As an example, as illustrated in FIG. 2, the first insulating layer 410 may be disposed downwardly in the Z direction, the lower surface of the first coil pattern 210 may be exposed to the lower surface of the first insulating layer 410, and an arrangement space of the noise removing portion 500 may be provided on an upper surface of the first insulating layer 410.

The second insulating layer 420 may cover the noise removing portion 500, and the second coil pattern 220 may be disposed on the first surface of the second insulating layer 420. In this case, the seed layer **220*b* of the second coil pattern 220 may be connected to the first surface of the second insulating layer 420. As an example, as illustrated in FIG. 2, the second insulating layer 420 is disposed upward in the Z direction, and a lower surface thereof may be bonded to the upper surface of the first insulating layer 410. In addition, the lower surface of the noise removing portion 500 may be exposed to the lower surface of the second insulating layer 420, and the arrangement space of the second coil pattern 220 may be provided on the upper surface thereof. In this case, the seed layer 220*b* may be disposed between the plating layer 220*a* of the second coil pattern 220 and the upper surface of the second insulating layer 420**.

The first coil pattern 210 and the noise removing portion 500 may be insulated from each other by the first insulating layer 410, and the second coil pattern 220 and the noise removing portion 500 may be insulated from each other by the second insulating layer 420.

The first and second insulating layers 410 and 420 may each be formed by stacking insulating films, after the first coil pattern 210 and the noise removing portion 500 are formed. The insulating film may be a conventional non-photosensitive insulating film such as an Ajinomoto build-up film (ABF) or a prepreg, or a photosensitive insulating film such as a dry film or PID. The first and second insulating layers 410 and 420 may serve as a dielectric layer when the first and second coil patterns 210 and 220 of the coil portion 200 and the noise removing portion 500 are capacitively coupled to each other.

At least a part of an upper surface, at least a part of a side surface, and at least a part of a lower surface of the insulating layer 400 may be covered with the insulating film IF. The insulating film IF may be formed of a known insulating material that may be used for insulating coating.

The insulating film IF may be disposed on an outer surface of the first and second coil patterns 210 and 220 and the insulating layer 400. That is, at least a part of the outer surface of the structure including the first and second coil patterns 210 and 220 and the first and second insulating layers 410 and 420 may be covered with the insulating film IF. Accordingly, the insulating film IF may insulate the first and second coil patterns 210 and 220 and the magnetic material inside the body 100 from each other.

More specifically, the insulating film IF may cover an upper surface and a side surface of the first coil pattern 210, and may fill a space between the patterns of the first coil pattern 210. In addition, the insulating film IF may cover at least a portion of the upper surface, at least a portion of the side surface, and at least a portion of the lower surface of the insulating layer 400. In addition, the insulating film IF may cover at least a part of the lower surface of the first coil pattern 210. In this case, the insulating film IF may fill a recess area on the lower surface of the first coil pattern 210.

Referring to FIGS. 2 to 4, the noise removing portion 500 is disposed between the first and second coil patterns 210 and 220 to be spaced apart from the first and second coil patterns 210 and 220. The noise removing portion 500 may be capacitively coupled to the coil portion 200 via the insulating layer 400.

The noise removing portion 500 may be disposed in the body 100 to discharge noise transmitted to the component and/or noise generated from the component to a mounting board or the like. Specifically, the noise removing portion 500 may be embedded in the body 100 and disposed in the structure of the coil portion 200, and a first end portion thereof may be exposed to the surface of the body 100.

In this case, the noise removing portion 500 may have a ring shape including an opening. That is, the noise removing portion 500 may form one open-loop. In addition, the noise removing portion 500 may be disposed to correspond to an area in which the coil portion 200 is disposed. That is, as illustrated in FIGS. 2 and 3, the noise removing portion 500 may be disposed so that at least some area of the noise removing portion 500 overlaps the first and second coil patterns 210 and 220, respectively.

As an example, the open-loop of the noise removing portion 500 may overlap the core portion disposed at the center of the spiral shape of the first and second coil patterns 210 and 220 as illustrated in FIG. 4. In addition, a line width of the noise removing portion 500 in the X and Y directions may have a value similar to a distance between an innermost turn and an outermost turn of the first and second coil patterns 210 and 220.

In this way, since the noise removing portion 500 is disposed in an area corresponding to the coil portion 200, it is possible to easily remove noise and minimize the reduction of magnetic material in the body 100. Therefore, it is possible to minimize the deterioration in the characteristics of the component due to the reduction of the magnetic material.

The noise removing portion 500 may have a first surface exposed to the lower surface of the second insulating layer 420, and may have the second surface that is spaced apart from and insulated from the second coil pattern 220 disposed on the upper surface of the second insulating layer 420. In this case, the first surface of the noise removing portion 500 exposed to the lower surface of the second insulating layer 420 may be spaced apart from and insulated from the first coil pattern 210 by the first insulating layer 410.

A first end portion of the noise removing portion 500 may be exposed to the first surface of the body 100. For example, as illustrated in FIG. 1, a first end portion of the noise removing portion 500 may be exposed onto a surface of a first end surface of the body 100 in the Y direction. The exposed first end portion of the noise removing portion 500 may be in contact with the ground electrode 600 disposed on the corresponding end surface of the body 100.

The ground electrode 600 may be connected to the ground of the mounting board when the coil component 1000 according to the exemplary embodiment in the present disclosure is mounted on the mounting board or the like, or may be connected to the ground of the electronic component package when the coil component 1000 according to the exemplary embodiment in the present disclosure is packaged in an electronic component package.

The noise removing portion 500 may be made of a conductive material such as copper (Cu), aluminum (Al), silver (Ag), tin (Sn), gold (Au) nickel (Ni), lead (Pb), titanium (Ti), or alloys thereof, but is not limited thereto. The pattern forming the noise removing portion 500 may be formed by a method including at least one of an electroless plating method, an electroplating method, a vapor deposition method such as sputtering, and an etching method, but is not limited thereto.

A pair of external electrodes 310 and 320 may be disposed outside the body 100. The pair of external electrodes 310 and 320 may be connected to the first and second coil patterns 210 and 220, respectively.

The pair of external electrodes 310 and 320 may include a first external electrode 310 and a second external electrode 320, and may be disposed on both end surfaces of the body 100 in the X direction, respectively. For example, the first external electrode 310 may be disposed on a first end surface of the body 100 in the X direction, and may be in contact with a first end portion of the second coil pattern 220 exposed to the corresponding end surface of the body 100. The second external electrode 320 may be disposed on a second end surface of the body 100 in the X direction, and may be in contact with the first end portion of the first coil pattern 210 exposed to the corresponding end surface of the body 100.

The first and second external electrodes 310 and 320 may partially extend in both end surfaces of the body 100 in the Y direction and both end surfaces of the body 100 in the Z direction, respectively. However, even in this case, the first and second external electrodes 310 and 320 are kept spaced apart from each other without being in contact with each other. In addition, the ground electrode 600 may be disposed between the first and second external electrodes 310 and 320. In this case, each of the external electrodes 310 and 320 and the ground electrode 600 are kept spaced apart from each other without being in contact with each other.

The first and second external electrodes 310 and 320 electrically connect the coil component 1000 to the mounting board when the coil component 1000 according to the exemplary embodiment in the present disclosure is mounted on a mounting board such as a printed circuit board. As an example, the coil component 1000 according to the present exemplary embodiment may be mounted so that the first surface of the body 100 in the Z direction faces the upper surface of the printed circuit board, in which the external electrodes 310 and 320 extending to the corresponding first surface of the body 100 and a connection part of the printed circuit board may be electrically connected to each other by the conductive coupling member.

The ground electrode 600 may be further disposed outside the body 100. The ground electrode 600 may be disposed to be spaced apart from the pair of external electrodes 310 and 320 and may be connected to the noise removing portion 500. That is, first end portion of the noise removing portion 500 exposed to the first surface of the body 100 may be in contact with the ground electrode 600 disposed outside the body 100.

The ground electrode 600 may be connected to the ground of the mounting board when the coil component 1000 according to the exemplary embodiment in the present disclosure is mounted on the mounting board or the like, or may be connected to the ground of the electronic component package when the coil component 1000 according to the exemplary embodiment in the present disclosure is packaged in the electronic component package.

The external electrodes 310 and 320 and the ground electrode 600 may include at least one of a conductive resin layer and an electrolytic plating layer. The conductive resin layer may be formed by printing a paste, and may include one or more conductive metals selected from the group consisting of copper (Cu), nickel (Ni), and silver (Ag), and a thermosetting resin. The electroplating layer may include one or more selected from the group consisting of nickel (Ni), copper (Cu), and tin (Sn).

Manufacturing Method

The substrate on which first and second metal layers are sequentially disposed on a support layer is prepared. The first and second metal layers may be disposed only on one side of the support layer, or may be disposed on both sides of the support layer. The support layer may include insulating resin, glass fiber, inorganic filler, and the like, and the first and second metal layers may each be copper foil, but are not limited thereto. The first and second metal layers may be attached with an adhesive material to facilitate peeling. The first metal layer may be thicker than the second metal layer. Such a support layer may be a conventional DCF (detach core film), and for example, seed Cu and carrier Cu of CCL may be interchanged and attached to the support layer.

Next, a first coil pattern 210 having a planar spiral pattern is formed on the second metal layer of the substrate. The first coil pattern 210 may be formed by the known plating technique using the second metal layer as the seed layer. The plating method does not matter for both isotropic plating and anisotropic plating, but the isotropic plating may be advantageous in a deviation in a plating thickness.

Next, the first insulating layer 410 into which at least a part of the first coil pattern 210 is embedded may be formed on the second metal layer of the substrate. As described above, the first insulating layer 410 may be formed by stacking the insulating film or the like on the second metal layer of the substrate so that the first coil pattern 210 is embedded. The stacking may be made by the known method.

Next, the noise removing portion 500 may be formed on the first insulating layer 410. The noise removing portion 500 may be formed by patterning a conductive metal by a method including at least one of an electroless plating method, an electroplating method, a vapor deposition method such as a sputtering method, and an etching method.

Next, the second insulating layer 420 may be formed on the first insulating layer 410 into which at least a part of the noise removing portion 500 is embedded. As described above, the second insulating layer 420 may be formed by the method of stacking the insulating film or the like on the first metal layer so that the noise removing portion 500 is embedded. The stacking may be made by the known method.

Next, a via hole may be formed to penetrate through one area of the first and second insulating layers 410 and 420. In this case, a third metal layer may be formed on the second insulating layer 420 including the via hole by the electroless plating, the sputtering, or the like. Then, the third metal layer may be used as the seed layer 220*b* of the second coil pattern 220.

Next, the second coil pattern 220 having the planar spiral pattern may be formed on the second insulating layer 420. The second coil pattern 220 may be formed by the known plating technique using the third metal layer as the seed layer. Similarly, the plating method does not matter for both isotropic plating and anisotropic plating, but the isotropic plating may be advantageous in the deviation in the plating thickness. On the other hand, when the second coil pattern 220 is formed, the via 230 may be formed together by plating inside the via hole.

Next, the first metal layer and the second metal layer are separated from each other. Through this separation, the first coil pattern 210, the second coil pattern 220, and the via 230 constituting the coil portion 200, and the first and second insulating layers 410 and 420 are peeled from the substrate. After the peeling, the second metal layer disposed on the lower surface of the first insulating layer 410 and the first coil pattern 210 and the third metal layer disposed on the upper surface of the second insulating layer 420 are removed by the known etching. As a result of the etching, the first coil pattern 210 may have a structure without the seed layer, and the second coil pattern 220 may have a structure in which a part of the third metal layer remains as the seed layer. As a result of the etching, the lower surface of the first coil pattern 210 may have a step difference from the lower surface of the first insulating layer 410 On the other hand, if necessary, the third metal layer may be separately removed by etching before the peeling.

Next, the core 150 penetrating through the centers of the first and second insulating layers 410 and 420 may be formed. The core 150 may be formed using a laser drill and/or a mechanical drill or the like. On the other hand, when a series of processes are performed on a large-sized insulating layer, the insulating layer may be diced and polished to a desired size, if necessary.

After the core 150 is formed, the insulating film IF may be formed using the known insulating coating. The insulating film IF may cover the upper and side surfaces of the first coil pattern 210, and may fill the space between the patterns of the first coil pattern 210. In addition, the insulating film IF may cover at least a portion of the upper surface, at least a portion of the side surface, and at least a portion of the lower surface of the insulating layer 400. In addition, the insulating film IF may cover at least a part of the lower surface of the first coil pattern 210. In this case, the insulating film IF may fill the recess area on the lower surface of the first coil pattern 21. A structure including the coil portion 200 and the insulating layer 400 may be formed through a series of processes.

Next, the body 100 may be formed by surrounding the structure including the coil portion 200 and the insulating layer 400 with a magnetic material. The body 100 may be formed by the method of stacking and compressing a magnetic sheet including metal magnetic powder particles and a binder resin on the upper and lower portions of the structure including the coil portion 200 and the insulating layer 400, but is not limited thereto. After the body 100 is formed, the external electrodes 310 and 320 and the ground electrode 600 may be formed on the body 100. The external electrodes 310 and 320 and the ground electrode 600 may be formed by the method of sequentially forming a conductive resin layer and a conductor layer on the body 100. However, the method of forming the external electrodes 310 and 320 and the ground electrode 600 is not limited thereto.

Meanwhile, the processes of manufacturing the coil component according to the exemplary embodiment are not necessarily limited to the abovementioned sequence. That is, a process described later may be first performed and a process described formerly may be performed as the subsequent process, if necessary.

As set forth above, according to the exemplary embodiment in the present disclosure, it is possible to easily remove the EMI noise of the coil component.

In addition, according to the exemplary embodiment in the present disclosure, it is possible to sufficiently securing the thickness of the magnetic material covering the coil and improving the inductance characteristics while miniaturizing and thinning the coil component.

While exemplary embodiments have been shown and described above, it will be apparent to those skilled in the art that modifications and variations could be made without departing from the scope of the present invention as defined by the appended claims.

What is claimed is:

1. A coil component, comprising:

a body comprising a magnetic material;

a non-magnetic insulating layer disposed in the body and having a through-hole;

a coil portion including a first coil pattern embedded in the insulating layer and having a first surface exposed to a first surface of the insulating layer and a second coil pattern disposed on a second surface of the insulating layer, facing the first surface of the insulating layer, the first and second coil patterns being disposed around the through-hole; and a noise removing portion disposed in the insulating layer and spaced apart from the first and second coil patterns, respectively, wherein the magnetic material fills the through-hole.

2. The coil component of claim 1, wherein the insulating layer includes a first insulating layer covering the first coil pattern and having the noise removing portion disposed on a first surface thereof, and a second insulating layer covering the noise removing portion and having the second coil pattern disposed on a first surface thereof.

3. The coil component of claim 2, wherein the first coil pattern is spaced apart from the first surface of the first insulating layer on which the noise removing portion is disposed and exposed to a second surface of the first insulating layer facing the first surface of the first insulating layer.

4. The coil component of claim 2, wherein the second coil pattern includes a plating layer and a seed layer disposed between the plating layer and the second insulating layer.

5. The coil component of claim 1, wherein the noise removing portion is disposed so that at least some area of the noise removing portion overlaps at least some area of the first and second coil patterns, respectively.

6. The coil component of claim 1, further comprising:

a pair of external electrodes disposed outside the body and connected to the first and second coil patterns, respectively.

7. The coil component of claim 6, further comprising:

a ground electrode disposed outside the body to be spaced apart from the pair of external electrodes and connected to the noise removing portion.

8. The coil component of claim 1, wherein each of the first and second coil patterns has a planar spiral shape.

9. The coil component of claim 1, wherein the noise removing portion forms an open-loop.

10. The coil component of claim 1, further comprising:

an insulating film disposed on outer surfaces of the first and second coil patterns and the insulating layer to insulate the first and second coil patterns and the body from each other.

11. The coil component of claim 1, further comprising:

a via penetrating through the insulating layer to connect the first and second coil patterns.

12. A coil component, comprising:

a first coil pattern;

a non-magnetic first insulating layer encapsulating the first coil pattern and having a first surface spaced apart from the first coil pattern and a through-hole around which the first coil pattern is disposed;

a noise removing portion disposed on the first surface of the first insulating layer;

a non-magnetic second insulating layer disposed on the first surface of the first insulating layer and covering the noise removing portion, the second insulating layer having a second surface spaced apart from the noise removing portion and the through-hole around which the second coil pattern is disposed;

a second coil pattern disposed on the second surface of the second insulating layer such that the first coil pattern and the second coil pattern are capacitively coupled to the noise removing portion; and a body comprising a magnetic material and encapsulating the first and second coil patterns, the first and second insulating layers and the noise removing portion, the magnetic material filling the through-hole.

13. The coil component of claim 12, wherein each of the first and second coil patterns has a portion exposed to a surface of the body and contacts a corresponding external electrode disposed on the surface of the body.

14. The coil component of claim 12, wherein the noise removing portion has a portion exposed to a surface of the body and contacts a ground electrode disposed on the surface of the body.

15. The coil component of claim 12, wherein the noise removing portion comprises a conductor, and the first and second coil patterns are connected by a via penetrating the first and second insulating layers and the noise removing portion, the via being insulated from the noise removing portion.

* * * * *